Dec. 21, 1937.   E. R. KOPPEL   2,102,850
UNIVERSAL JOINT
Filed Feb. 24, 1936
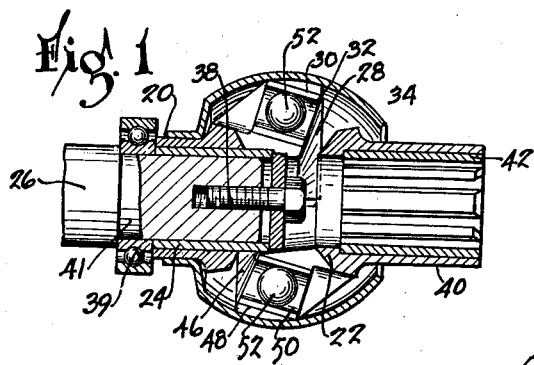
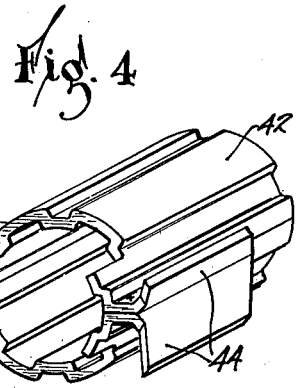
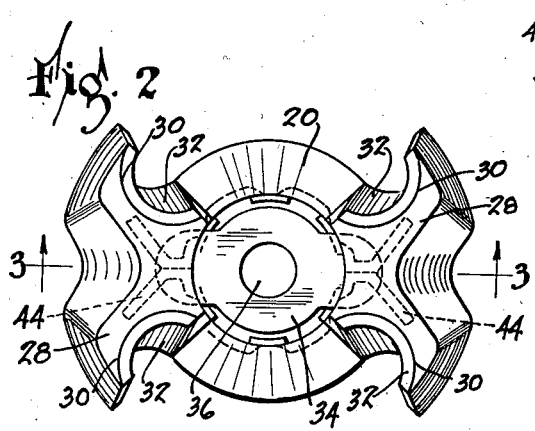
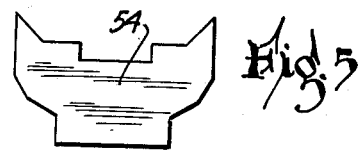
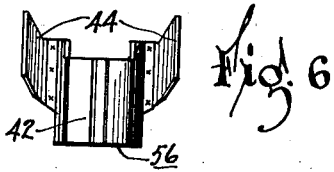
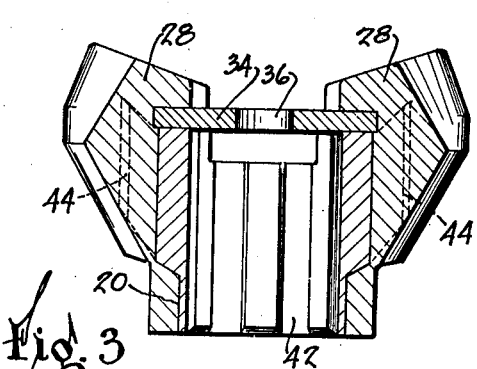
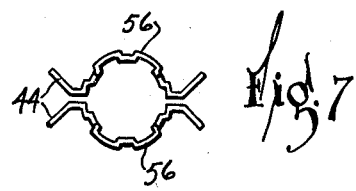
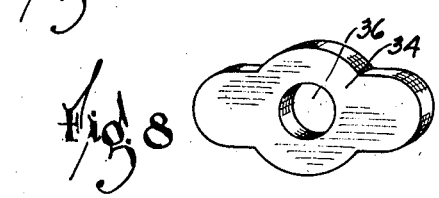
INVENTOR.
ERNEST R. KOPPEL
BY
ATTORNEY Patented Dec. 21, 1937

2,102,850

UNITED STATES PATENT OFFICE 2,102,850

UNIVERSAL JOINT

Ernest R. Koppel, South Bend, Ind., assignor to Bendix Products Corporation, South Bend, Ind., a corporation of Indiana Application February 24, 1936, Serial No. 65,256

8 Claims. (Cl. 64—21)

This invention relates to universal joints of the constant angle velocity type adapted to be formed by a die-casting operation. It has been found that in order to successfully form a universal joint by a die-casting operation it is necessary to provide some means for reinforcing the joints, because the joint is subjected to severe periodic overloads during normal operation which would overstress a true die-cast joint.

It has also been found that, where a universal joint of the general type disclosed in the accompanying drawing is provided with splined means to fix both members of the joint to the respective driving and driven shafts, a certain amount of end motion is necessary between the body sections. Better results can be obtained in this type of universal joint when one of the joint members is fixed with respect to its shaft, and whatever end motion is necessary is taken care of between the splined member and its respective shaft.

An object of this invention is therefore to provide a constant angle velocity universal joint having reinforced steel, iron, or other suitable inserts surrounded by a die-cast body section to form the desired structure.

A further object of the invention is to provide a universal joint having a splined insert formed by a stamping operation to form a series of intermittent segments to facilitate a more perfect bond between the insert and the die-cast body section.

Another object of the invention is to provide a stamped insert of the splined cylindrical type having radially projecting segments adapted to extend into the arms of the body sections of the joint to reinforce those sections.

A still further object of the invention is to provide a splined cylindrical insert for a die-cast universal joint which may be stamped in the form of two oppositely disposed sections and welded together to form a completed reinforcing insert.

Another object of the invention is to provide a cast universal joint preferably of the constant angle velocity type, wherein one body section of the joint may be securely fixed to the end of one of the driving or driven shafts, and the other body section of the joint may be provided with splined means to connect it to the end of the other shaft.

A further object of the invention is to provide a universal joint which may be cast with an attaching segment formed integrally therewith to fix the body section of the joint to a shaft.

Yet a further object of the invention is to provide a method of forming a die-cast universal joint having reinforcing inserts which comprises forming the reinforcing inserts by a stamping operation, welding the matching portions of the stampings together, and forming a body section around the inserts by a die-casting operation.

Another object of the invention is to provide means to fix a universal joint member to the end of a shaft by means of a structure which forms an abutment to engage the end of a shaft bearing, thereby fixing the position of the bearing with reference to the joint member.

Other objects and advantages of the present invention will be apparent from the following detailed description thereof, considered in connection with the accompanying drawing, submitted for purposes of illustration only, and not intended to define the scope of the invention, reference being had for that purpose to the subjoined claims.

In the drawing wherein similar reference characters refer to similar parts throughout the several views:

Figure 1 is a vertical section through a universal joint formed in accordance with the teachings of the present invention;

Figure 2 is an end elevation of one of the body sections illustrated in Figure 1;

Figure 3 is a view taken on the line 3—3 of Figure 2;

Figure 4 is an isometric projection of a splined welded insert adapted for use in one of the body sections of the joint;

Figure 5 is a plan view of a blank proportioned to form the insert illustrated in Figure 4;

Figure 6 is a view similar to Figure 5 showing the blank after it has been subjected to the stamping operation;

Figure 7 is an end view of a pair of matching stamped segments preparatory to being fixed together to form the completed insert; and Figure 8 is an isometric projection of a lug adapted to be cast in one of the body sections to secure one element of the joint to a shaft.

Referring more particularly to Figure 1, there is shown for purposes of illustrating this invention a constant angle velocity universal joint having a pair of body sections 20 and 22. The body section 20 is provided with a shank 24 adapted to engage one end of a shaft 26. The body section 20 is also formed with a pair of arms 28. Each of the arms 28 is provided with cylindrically shaped grooves 30 adapted to receive hardened race inserts 32. A lug 34 is fixed in the body section 20 between the arms 28, and is provided with an aperture 36 through which a bolt 38 extends into the end of the shaft 26 to securely fix the body section 20 to the shaft 26.

It will be apparent that the shaft bearing 39 may be positioned between the ends of the body section of the joint and an undercut portion 41 of the shaft 26, as clearly illustrated in Figure 1. This suspension eliminates many of the difficulties encountered in adjusting and relocating the shaft bearings.

The body section 22 is provided with a shank 40 having a splined insert member 42 provided with reinforcing segments 44 (Figure 4). The body section 22 is also formed with a plurality of arms 46 provided with cylindrically shaped grooves 48 provided with hardened race inserts 50.

A plurality of balls 52 are positioned between the adjacent surfaces of the arms 28 and 46 in the hardened inserts 32 and 50 to transmit torsional force from the body sections of the joint to the other. The splined insert 42 may be formed of any suitable material such as iron or steel of various grades and a number of suitable alloys. It has been found that one very desirable material from which inserts may be fabricated is steel of the grade S. A. E. 1010. The insert may be blanked out of flat stock 54 of suitable gauge, as illustrated in Figure 5, and may be formed by subjecting it to a forming operation, either a single stamp operation or a number of successive operations, each of which forms the material to a greater extent to form the segments 44 illustrated in Figure 6. As illustrated in Figure 7 a pair of oppositely disposed stampings 56 of the type illustrated in Figure 6 may be positioned together to form the insert illustrated in Figure 4. The stampings 56 may be fixed together in any desired manner such as by a welding operation wherein abutting surfaces may be welded simultaneously or separately, as desired.

After the stampings 56 have been welded together a broach or other suitable tool may be passed longitudinally through the insert to clean out the splined sections.

When the inserts have been thus formed they may be placed in a die-casting machine adapted to also receive the hardened race inserts 32 and 50, and the body section of the joint die-cast on the insert to form the complete universal joint member.

The material used in the die-casting operation may be any one of a number of alloys including the aluminum and zinc alloys, brass or bronze alloys, brastile or any other suitable alloy. If desired, a number of materials may be alloyed together to form a structure possessing the strength and durability desired.

With this type of joint it is generally unnecessary to do any machine work on the joint after the die-casting operation is completed; however, it may be desirable to take a light cut with a finishing tool to produce the desired finish on the various parts of the joint.

While the invention has been described with particular reference to a universal joint of the constant angle velocity type having coacting projecting arms adapted to transmit torsional effort from one body member of the joint to the other, it is to be understood that the invention may also be applied to other types of universal joints and to parts of similar shape.

The splined inserts may, if desired, be subjected to a heat-treating operation after they have been formed. The race inserts positioned in the arms of the joint are preferably subjected to a heat-treating operation to increase the hardness thereof, and are normally subjected to a heat-treating operation sufficient to produce a hardened surface of approximately 60 points on the Rockwell "C" scale.

Features shown but not claimed herein are being claimed in the copending application of John M. Floyd Serial No. 65,068, filed February 21, 1936, and assigned to applicant's assignee.

While the invention has been described with particular reference to two desirable embodiments, it is not intended to limit the scope of the invention to the embodiments illustrated and described, nor otherwise than by the terms of the following claims.

I claim:

1. In a constant angle velocity universal joint member including a plurality of spaced arms, a stamped splined welded longitudinally extending reinforcing insert having radially extending reinforcing segments, an apertured member having radially extending projections and a die-cast universal joint body section including a pair of spaced arms surrounding the insert the radially extending reinforcing segments and projections of the joint.

2. In a universal joint member, a die-cast body section including a pair of spaced arms, a reinforcing insert having radially extending reinforcing segments extending into the arms, and an apertured member extending into the spaced arms and adapted to receive a bolt to fix the joint member to a shaft.

3. In combination a shaft, a die-cast universal joint member including a body section and a plurality of spaced arms, an apertured member having a plurality of generally radially extending projections extending into the spaced arms, and means associated with the apertured member to fix the joint member to the shaft.

4. In combination a shaft, a die-cast universal joint member including a body section and a pair of spaced arms, reinforcing inserts including radially extending segments positioned in the joint member, an apertured member extending into the spaced arms, a bolt extending through the apertured member to fix the joint member to the shaft, and a pair of hardened race inserts positioned in each of the arm members.

5. In a universal joint member adapted to engage a shaft having a reduced outer section, a die-cast body section including a pair of spaced arms, a reinforcing insert having radially extending reinforcing segments extending into the arms, an apertured member extending into the spaced arms and adapted to receive a bolt to fix the joint member to the shaft, and a bearing positioned between the reduced outer section of the shaft and the body section of the joint.

6. A die-cast universal joint member including a body section and a plurality of spaced arms, a stamped reinforcing insert positioned in the body section and provided with radially extending reinforcing segments projecting into the spaced arms, and means including an apertured member having projections extending into the arms adapted to fix the joint member to a shaft.

7. A die-cast universal joint member of the constant angle velocity type including a body section and a plurality of spaced arms having raceways on opposite sides of each arm, a stamped reinforcing insert positioned in the body section and provided with radially extending reinforcing segments projecting into the spaced arms, an apertured member having projections extending into the arms to fix the joint member to a shaft, and hardened race inserts positioned in the raceways.

8. In a constant angle velocity universal joint member, a stamped splined welded longitudinally extending reinforcing insert having radially extending reinforcing segments, an apertured member having generally radially extending projections, a die-cast body section including a pair of spaced arms surrounding the insert and the radially extending reinforcing segments and projections, and a pair of hardened race inserts positioned in each of the arms to distribute the torsional forces exerted on the arms over a comparatively large area of each of the die-cast arms.

ERNEST R. KOPPEL.